United States Patent
Lill et al.

(10) Patent No.: US 12,463,427 B2
(45) Date of Patent: Nov. 4, 2025

(54) METHOD AND CIRCUIT FOR AN INTEGRATED DC CONVERTER IN AN AC BATTERY

(71) Applicant: Dr. Ing. h.c. F. Porsche Aktiengesellschaft, Stuttgart (DE)

(72) Inventors: Sven Lill, Lauffen (DE); Eduard Specht, Bruchsal (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 307 days.

(21) Appl. No.: 18/362,979

(22) Filed: Aug. 1, 2023

(65) Prior Publication Data
US 2024/0055858 A1 Feb. 15, 2024

(30) Foreign Application Priority Data

Aug. 9, 2022 (DE) .................... 10 2022 120 021.3

(51) Int. Cl.
 *H02J 3/18* (2006.01)
 *H02M 3/00* (2006.01)
(52) U.S. Cl.
 CPC ............. *H02J 3/1857* (2013.01); *H02M 3/01* (2021.05)
(58) Field of Classification Search
 CPC .......... H02M 3/01; H02M 3/015; H02M 3/04; H02M 3/335; H02M 3/33571;
 (Continued)

(56) References Cited

U.S. PATENT DOCUMENTS

| 10,186,861 B2 | 1/2019 | Rapp et al. |
| 2013/0241472 A1 | 9/2013 | Feuerstack et al. |

(Continued)

FOREIGN PATENT DOCUMENTS

| CN | 102570560 A | 7/2012 |
| DE | 102010041040 A1 | 3/2012 |

(Continued)

OTHER PUBLICATIONS

Stefan M. Goetz, et al., "Modular Multilevel Converter With Series and Parallel Module Connectivity: Topology and Control", p. IEEE Transactions on Power Electronics, Jan. 2015, pp. 203-215, vol. 30, Is. No.1, doi: 10.1109/TPEL.2014.2310225.

*Primary Examiner* — Nguyen Tran
(74) *Attorney, Agent, or Firm* — LEYDIG, VOIT & MAYER, LTD.

(57) ABSTRACT

A method for ancillary supply in a modular multi-level converter with a plurality of modules arranged in strands, a respective module including at least two half bridges with semiconductor switches and at least one energy accumulator, which are interconnected in parallel. In the respective module, an at least single-core input terminal is formed through respective center tapping in at least one half bridge on an input side, and an at least single-core output terminal is formed through respective center tapping in at least one half bridge on an output side. The strands are interconnected into at least one star point on the at least single-core input terminal of a first module in the respective strand. A respective phase of a supply voltage in a high-voltage system is formed on the at least single-core output terminal of a last module in the respective strand.

15 Claims, 5 Drawing Sheets

(58) Field of Classification Search
CPC ......... H02M 3/33573; H02M 3/33569; H02M 3/33546; H02M 3/33576; H02M 3/3372; H02M 3/3376; H02J 3/1857; H02J 3/18; H02J 3/1828; H02J 3/1842
See application file for complete search history.

(56) References Cited

U.S. PATENT DOCUMENTS

| | | | |
|---|---|---|---|
| 2017/0187276 A1* | 6/2017 | Townsend | H02M 7/00 |
| 2017/0250621 A1* | 8/2017 | Townsend | H02M 1/084 |
| 2018/0123496 A1 | 5/2018 | Ilic et al. | |
| 2023/0049615 A1* | 2/2023 | Drofenik | H02M 5/18 |

FOREIGN PATENT DOCUMENTS

| | | |
|---|---|---|
| DE | 102015205278 A1 | 9/2016 |
| DE | 102019102306 A1 | 7/2020 |
| WO | WO 2014206723 A1 | 12/2014 |
| WO | WO 2018210451 A1 | 11/2018 |

* cited by examiner

METHOD AND CIRCUIT FOR AN INTEGRATED DC CONVERTER IN AN AC BATTERY

CROSS REFERENCE TO RELATED APPLICATIONS

This application claims benefit to German Patent Application No. DE 10 2022 120 021.3, filed on Aug. 9, 2022, which is hereby incorporated by reference herein.

FIELD

The present invention relates to a method and a circuit for a DC converter integrated in an AC battery. The present invention also relates to a battery system which, in addition to high-voltage consumers, also supplies low-voltage consumers by means of the integrated DC converter.

BACKGROUND

DC converters, also referred to as DC-DC converters, are used, for example in electrical vehicles, in order to convert a high-voltage supply voltage of the traction battery of, for example, at least 400 V down to voltage values of ancillary units, for example 48 V, or an on-board power system, for example, 12 V. Depending on the type of ancillary unit or on-board power system components connected, such DC converters are sometimes designed bi-directionally in order to also enable a charging of the traction battery. The respective DC converters are usually connected to the same terminals of the traction battery, to which a respective inverter with a traction motor is also connected.

One such modular multi-level converter, abbreviated as MMC, and described, for example, in "Goetz, S. M.; Peterchev, A. V.; Weyh, T., "Modular Multilevel Converter With Series and Parallel Module Connectivity: Topology and Control," Power Electronics, IEEE Transactions on, vol. 30, no. 1, pp. 203,215, 2015. doi: 10.1109/TPEL.2014.2310225 can be used in order to directly generate an AC voltage and/or multi-phase voltage as a supply voltage for one or more consumers by dynamically reconfiguring a battery circuit. In this sense, the modular multi-level converter is an AC battery or alternating current battery, wherein the battery circuit relates to an entirety of all of the interconnected primary cells, ancillary cells, capacitors of all types, or generally to power sources or energy accumulators that only use DC voltage. With such a modular multi-level converter, high-voltage supply voltages of, for example, 400 V for a traction system of an electric vehicle can be provided.

U.S. publication US 2018/0123496 A1 discloses a modular low-voltage power system for an electric vehicle. The low-voltage power system comprises a plurality of power modules each comprising a battery module, an inverter circuit, and a single-phase rectifier.

Publication DE 10 2019 102 306 A1 discloses an AC battery with three battery module strands, which are interconnected in a symmetrical module topology, which comprises on the input and output sides two half bridges around one energy accumulator unit, and have two star points. An additional module is connected to the two star points in order to provide a 48V on-board power supply, wherein a DC/DC converter for providing a 12V on-board power supply is connected downstream of that module.

Chinese publication CN 102570560 A discloses a charging/discharging system for an electric vehicle having a bi-directional vehicle-to-grid power conversion. A first power converter stage comprises a single-phase or three-phase pulse width-modulated converter. A second power converter stage comprises an LLC converter.

SUMMARY

In an embodiment, the present disclosure provides a method for ancillary supply in a modular multi-level converter, wherein the modular multi-level converter comprises a plurality of modules, the method comprising arranging the plurality of modules in strands, wherein a respective module comprises at least two half bridges with semiconductor switches and at least one energy accumulator, which are interconnected in parallel. The method further comprises forming, in the respective module, an at least single-core input terminal through respective center tapping in at least one half bridge on an input side, and forming an at least single-core output terminal through respective center tapping in at least one half bridge on an output side. The method further comprises interconnecting the strands into at least one star point on the at least single-core input terminal of a first module in the respective strand and forming, on the at least single-core output terminal of a last module in the respective strand, a respective phase of a supply voltage in a high-voltage system. The method further comprises forming a respective ancillary terminal on a respective star point, wherein a common positive potential terminal having a respective positive potential of the first module is connected in the respective strand and a common negative potential terminal having a respective negative potential of the first module is connected in the respective strand. The method further comprises providing a first ancillary supply in the respective strand by connecting a selected converter to an associated selection from among the respective ancillary terminal, the common positive potential terminal, and the common negative potential terminal, and by associated control of the semiconductor switches of the at least one input-side half bridge of the first module.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
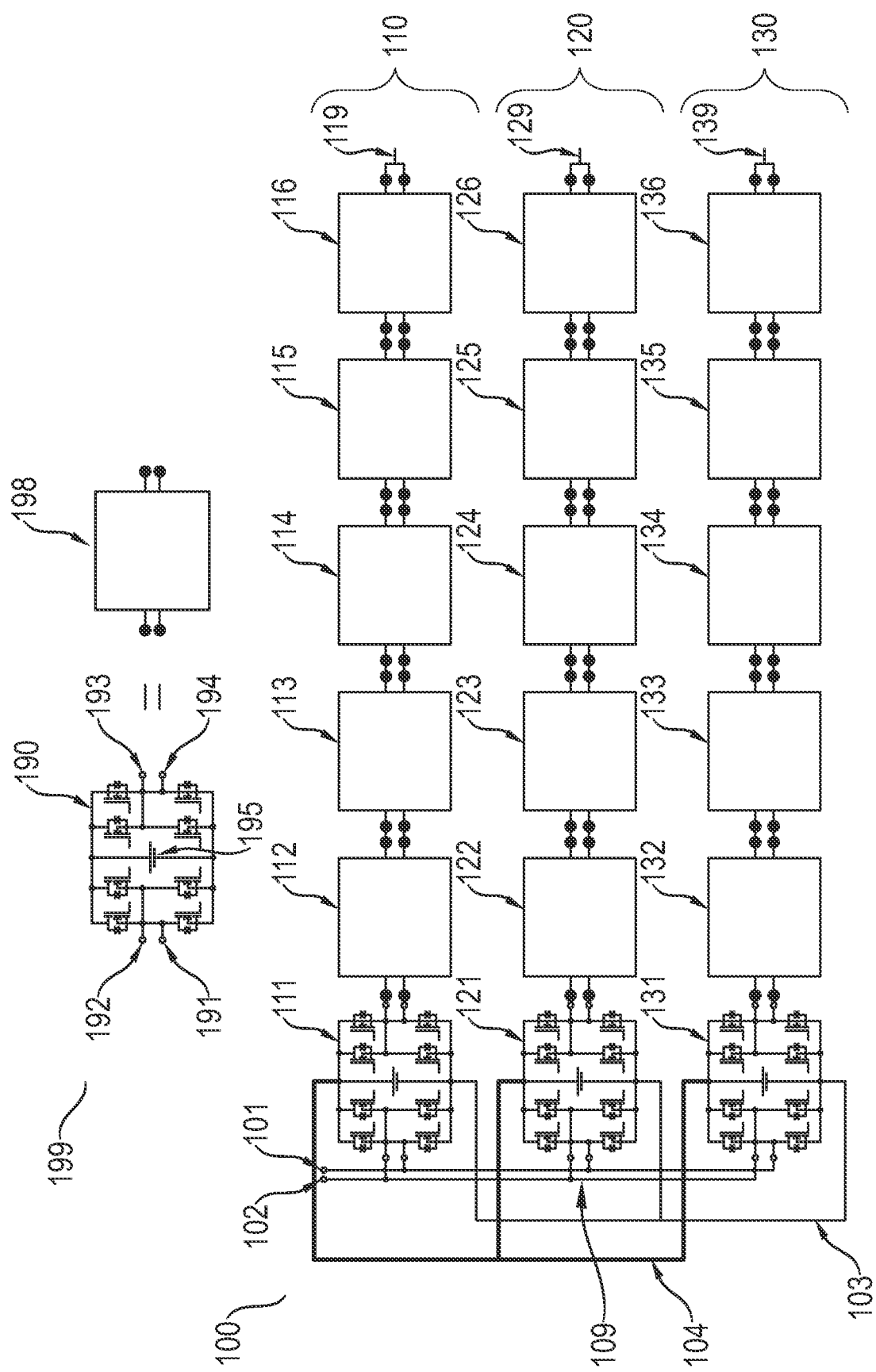
FIG. 1 schematically shows a configuration of a circuit with secondary terminals according to an embodiment of the invention.

In an embodiment, the present invention provides a method and a circuit for an ancillary supply output on a multi-level modular converter with multiple module strands, designed as a traction battery, wherein losses of the module semiconductors or connected DC converters are to be avoided. Individual module strands with different loads are also avoided. It is further ensured that the ancillary supply output is independent of a high-voltage supply of the traction system.

In an embodiment, a method for an ancillary supply with a modular multi-level converter is provided, wherein the modular multi-level converter comprises a plurality of modules arranged in strands. A respective module comprises at least two half bridges having semiconductor switches and at least one energy accumulator. The at least two half bridges and the at least one energy accumulator are interconnected in parallel. In the respective module, an at least single-core input terminal is formed through respective center tapping in at least one half bridge on an input side, and an at least single-core output terminal is formed through respective center tapping in at least one half bridge on an output side. The strands are interconnected into at least one star point on the at least single-core input terminal of the first module in the respective strand. On the at least single-core output terminal of the last module in the respective strand, a respective phase of a supply voltage is formed in a high-voltage system. A respective ancillary terminal is formed on the respective star point. A common positive potential terminal having a respective positive potential of the first module is connected in the respective strand and a common negative potential terminal having a respective negative potential of the first module is connected in the respective strand. By connecting a selected converter to an associated selection from among the respective ancillary terminal, the common positive potential terminal, and the common negative potential terminal and by means of associated control of the semiconductor switches of the at least one input-side half bridge of the first module, a first ancillary supply is provided in the respective strand.

A first modular multi-level converter within the meaning of embodiments of the invention comprises, for example, modules having a first half bridge on the input side and a second half bridge on the output side. The two half bridges are interconnected in parallel with an energy accumulator. Such modules have respective single-core input and output terminals with center tapping. The result is a single star point.

A second modular multi-level converter within the meaning of embodiments of the invention comprises, for example, modules comprising on the input side two half bridges and on the output side also two half bridges. All half bridges are interconnected in parallel with an energy accumulator. Such modules have respective dual-core input and output terminals with center tapping. The result is a double star point. Such a second modular multi-level converter is used, for example, by the above-cited MMC or MMSPC by Getz, Peterchev, and Weyh.

In a method according to an embodiment of the invention, a synchronous converter is selected as the converter. On the input side, the respective ancillary terminal is connected to an inductance L and the common negative potential terminal is connected to a capacitance C as an DC link capacitor. As a result, a simple synchronous converter is formed on the output side as the first ancillary supply.

In a method according to an embodiment of the invention, the respective modules comprise four half bridges with dual-core input and output terminals. Two star points are formed, wherein a first side terminal is connected to the first star point and a second side terminal is connected to the second star point. A dual active bridge is selected as the converter. On the input side, the first ancillary terminal is connected to a first terminal of a first transformer coil of the dual active bridge and the second ancillary terminal is connected to a second terminal of the first transformer coil of the dual active bridge. The transformer "sees" on the input side the half bridges connected in parallel to the respective first modules of the respective strand connected thereto as a full bridge. Together with the full bridge arranged on the output side, the dual active bridge is formed.

In a method according to an embodiment of the invention, an LLC converter is selected as the converter. For this purpose, a resonance capacitor is arranged opposite the dual active bridge between the first ancillary terminal and the first terminal to the first transformer coil. The semiconductor switches of the half bridges connected in parallel are actuated according to the resonant operation of the LLC converter.

In a method according to an embodiment of the invention, a multi-phase synchronous converter is selected as the converter. A respective inductance is arranged between the respective at least single-core input terminal of the first module in the respective strand and the at least one star point. The common negative potential terminal is connected to a capacitance. By means of the respective inductances and the capacitance, a multi-phase synchronous converter is formed.

In a method according to an embodiment of the invention, a second ancillary supply is provided by means of the common positive potential terminal and the common negative potential terminal. Compared to a direct tapping known from the prior art, this second ancillary supply advantageously has a lower impedance at the double star point, because, according to an embodiment of the present invention, a respective supply current does not have to flow through at least two semiconductor switches, but rather the tapping takes place directly at the respective potentials. For example, a supply voltage of 48 V is provided at the second ancillary supply. In comparison to the prior art, it is thus advantageously no longer necessary to continuously displace the respective semiconductor switches of the first modules per strand in a parallel mode in order to ensure an ancillary supply with direct tapping at the double star point.

In a method according to an embodiment of the invention, the modular multi-level converter is formed with three strands. A three-phase supply voltage for a three-phase motor of a vehicle is provided.

Furthermore, a circuit to an ancillary supply is provided with a modular multi-level converter, wherein the modular multi-level converter comprises a control and a plurality of modules arranged in strands. A respective module comprises at least two half bridges having semiconductor switches and at least one energy accumulator. The at least two half bridges and the at least one energy accumulator are interconnected in parallel. In the respective module, an at least single-core input terminal is formed through respective center tapping in at least one half bridge on an input side, and an at least single-core output terminal is formed through respective center tapping in at least one half bridge on an output side. The strands are interconnected into at least one star point on the at least single-core input terminal of the first module in the respective strand. On the at least single-core output terminal of the last module in the respective strand, a respective phase of a supply voltage is formed in a high-voltage system. A respective ancillary terminal is formed on the respective star point. A common positive potential terminal having a respective positive potential of the first module is connected in the respective strand and a common negative potential terminal having a respective negative potential of the first module is connected in the respective strand. By connecting a selected converter to an associated selection from among the respective ancillary terminal, the common positive potential terminal, and the common negative potential terminal and by means of associated control of the semiconductor switches of the at least one input-side half bridge of the first module, a first ancillary supply is provided in the respective strand.

The circuit topology formed in the respective module, with the at least one half bridge arranged symmetrically to the at least one energy accumulator on the input side as well as on the output side, is also referred to as a symmetrical topology. This differs from so-called asymmetrical topology, in which the at least one energy accumulator is first located on the input side, with which the at least one energy accumulator is then formed over all first modules of the strands of the at least one star point.

However, in symmetrical topology, for an ancillary supply terminal, the semiconductor switch located on the input side of the first module of the respective strand must always be connected to the at least one half bridge, which in the prior art carries efficiency losses, in particular because a current flowing to the at least one star point encounters a respective resistance of these semiconductor switches. A DC converter connected to the at least one star point can also provide semiconductor switches with additional inductance or additional inductances, which further reduce the efficiency. All of these disadvantages are advantageously overcome in the circuit according to embodiments of the invention by the efficient use of the semiconductor switches in the first module of the respective strand, which are directly connected to the at least one star point.

In a circuit according to an embodiment of the invention, a synchronous converter is selected as the converter. On the input side of the synchronous converter, the respective ancillary terminal is connected to an inductance L of the synchronous converter. The common negative potential terminal is connected to a capacitance C of the synchronous converter. As a result, a simple synchronous converter is formed on the output side as the first ancillary supply.

In a circuit according to an embodiment of the invention, the respective modules comprise four half bridges with dual-core input and output terminals. Two star points are formed, wherein a first side terminal is connected to the first star point and a second side terminal is connected to the second star point. A dual active bridge is selected as the converter. On the input side, the first ancillary terminal is connected to a first terminal of a first transformer coil of the dual active bridge and the second ancillary terminal is connected to a second terminal of the first transformer coil of the dual active bridge. The transformer "sees" on the input side the half bridges connected in parallel to the respective first modules of the respective strand connected thereto as a full bridge. Together with the full bridge arranged on the output side, the dual active bridge is formed.

In a circuit according to an embodiment of the invention, an LLC converter is selected as the converter. For this purpose, a resonance capacitor is arranged opposite the dual active bridge between the first ancillary terminal and the first terminal to the first transformer coil. An actuation of the semiconductor switches of the half bridges connected in parallel occurs in accordance with the resonant operation of the LLC converter.

In a circuit according to an embodiment of the invention, a multi-phase synchronous converter (509) is selected as the converter. A respective inductance is arranged between the respective at least single-core input terminal of the first module in the respective strand and the at least one star point. The common negative potential terminal is connected to a capacitance. By means of the respective inductances and the capacitance, a multi-phase synchronous converter is formed.

The aforementioned converters do not limit the selection of further conceivable converters, which have, for example, a full bridge actuation with center-point switching at the output, or are embodied as, for example, a counter-cycle current converter with a current doubling element at the output.

In a circuit according to an embodiment of the invention, a second ancillary supply is provided by means of the common positive potential terminal and the common negative potential terminal. The second ancillary supply has a lower impedance compared to a direct tapping at the double star point. A respective electrical connection for the common positive potential terminal and the common negative potential terminal can be provided, for example, by copper bars.

In a circuit according to an embodiment of the invention, the modular multi-level converter is formed with three strands, and a three-phase supply voltage for a three-phase motor is provided.

Furthermore, a modular multi-level converter with at least one ancillary supply is provided, which comprises a circuit according to an embodiment of the invention and on which a method according to an embodiment of the invention is carried out.

Additional advantages and configurations of embodiments of the invention result from the description and the enclosed drawings.

It goes without saying that the aforementioned features and the features yet to be explained in the following can be used not only in the respectively specified combination, but also in other combinations or on their own, without leaving the scope of the present invention.

The figures are described contiguously and comprehensively, and like components bear the same reference numerals.

In FIG. 1, a configuration 100 of the circuit according to an embodiment of the invention is schematically shown with ancillary terminals 101, 102, 103, 104 in a modular multi-level converter having a plurality of modules 111, 112, 113, 114, 115, 116, 121, 122, 123, 124, 125, 126, 131, 132, 133, 134, 135, 136 arranged in strands 110, 120, 130. As shown in the cutout 199, a respective module 190 or 198 comprises four half bridges with semiconductor switches, e.g., MOSFETs, and an energy accumulator 195, which are interconnected in parallel. A dual-core input terminal 191, 192 is formed by a respective center tapping at two half bridges on an input side, and a dual-core output terminal 193, 194 is formed by a respective center tapping at two half bridges on an output side. The strands 110, 120, 130 are interconnected at the dual-core input terminal 191, 192 of the respective first module 111, 121, 131 into a double star point 109. A respective phase $V_U$ 119, $V_V$ 129, $V_W$ 139 of a supply voltage in a high-voltage system is formed on the dual-core output terminal 193, 194 of the respective last module 116, 126, 136. At the double star point 109, a first ancillary terminal X1 101 is formed at a first star point of the double star point 109 and a second ancillary terminal X2 102 is formed at a second star point of the double star point 109. A common positive potential terminal P 104 is connected to a respective positive potential of the first module 111, 121, 131 in the respective strand 110, 120, 130, and a common negative potential terminal M 103 is connected to a respective negative potential of the first module 111, 121, 131 in the respective strand 110, 120, 130.

Figure 2:
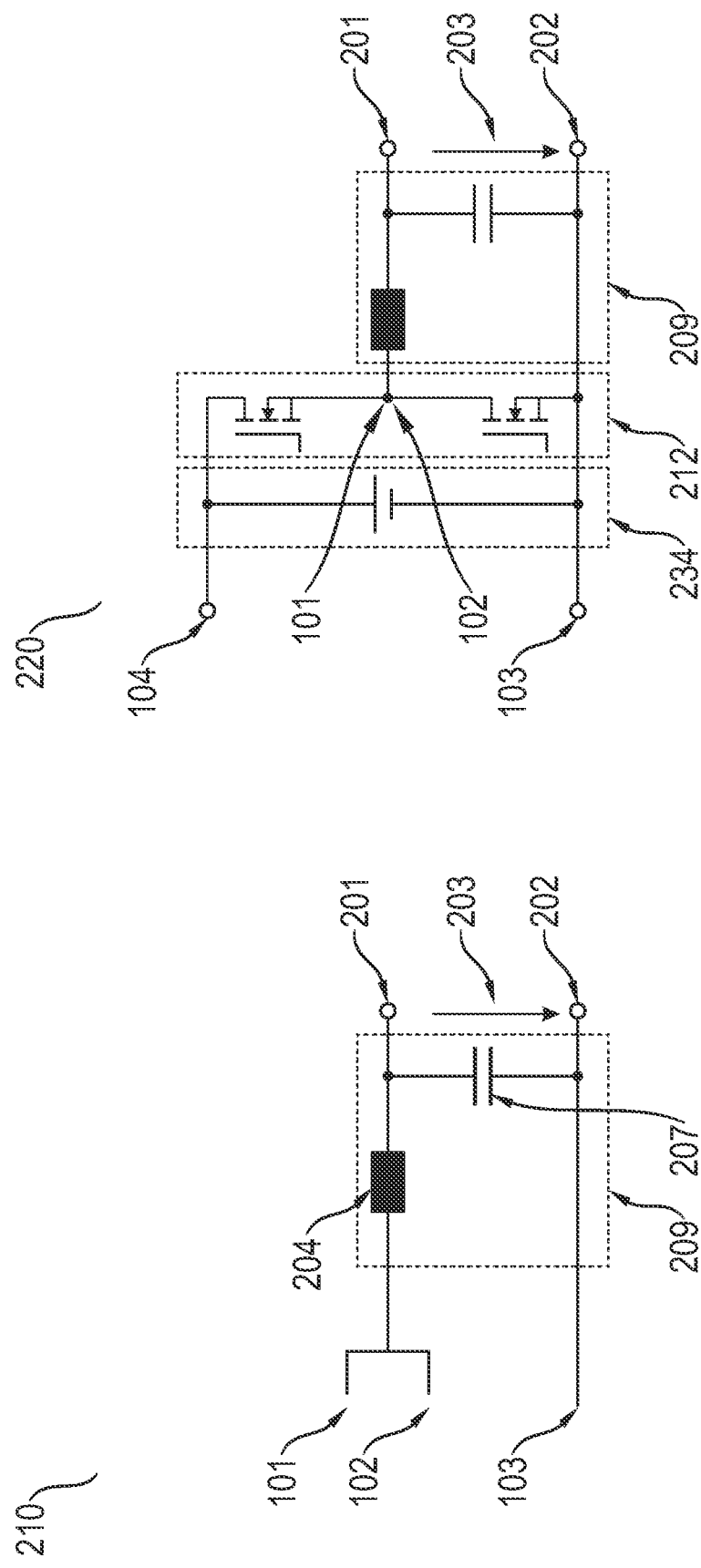
FIG. 2 schematically shows a configuration of a circuit according to an embodiment of the invention with a synchronous converter as the first ancillary supply.

In FIG. 2, a further configuration 210, 220 of the circuit according to an embodiment of the invention is shown schematically, with a synchronous converter 209 as the first ancillary supply. In the circuit terminal 210, both ancillary terminals X1 101 and X2 102 are connected to an inductance L 204 of the synchronous converter 209. The common negative potential terminal M 103 is connected to a capacitance C 207 of the synchronous converter 209. Between a first output 201 of the synchronous converter 209 and a second output 202 of the synchronous converter 209, an ancillary supply voltage 203 of, for example, 12 V is formed. In the equivalent circuit diagram 220, the input side of the synchronous converter 209 is shown, which shows in greater detail how respective inputs of the synchronous converter 209 are connected with the common negative potential terminal M 103 to a parallel circuit of the energy accumulators 234 and the half bridges 212 and with the ancillary terminals X1 101 and X2 102.

Figure 3:
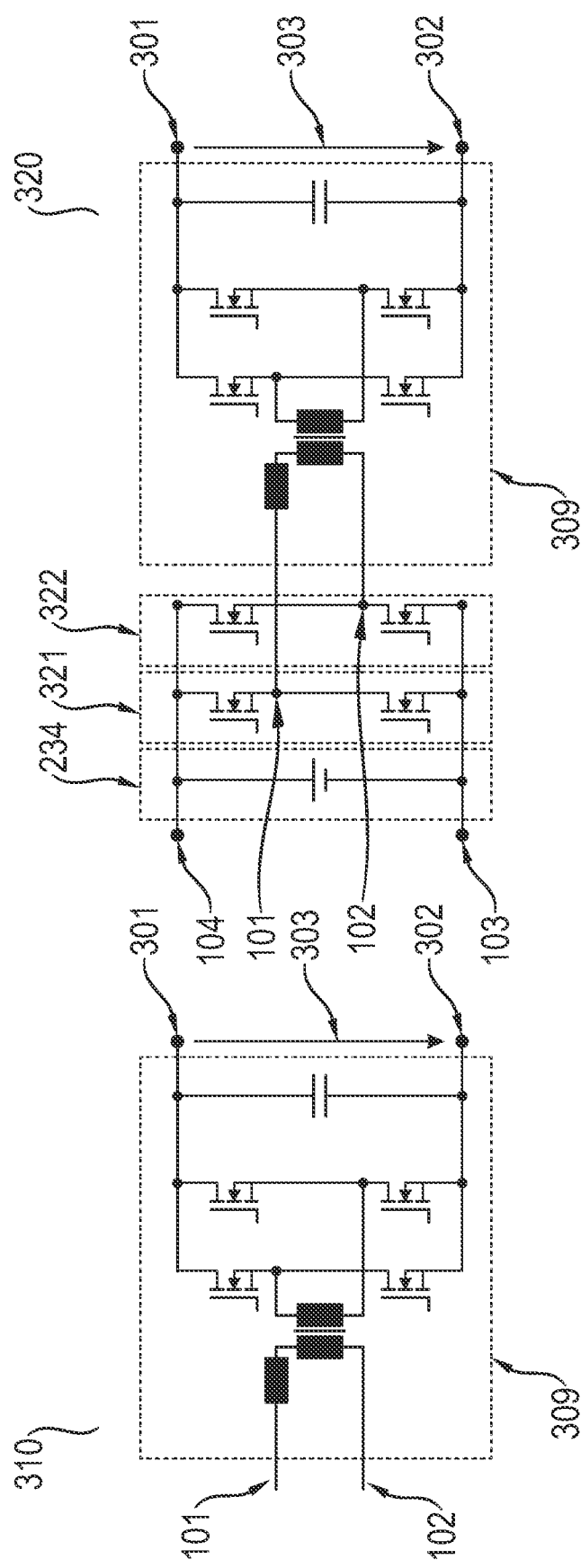
FIG. 3 schematically shows a configuration of a circuit according to an embodiment of the invention with a dual active bridge as the first ancillary supply.

In FIG. 3, yet another configuration 310, 320 of the circuit according to an embodiment of the invention is shown schematically, with a dual active bridge 309 as the first ancillary supply. In the circuit terminal 310, the first ancillary terminal X1 101—via a symbolically depicted leakage inductance of the transformer—is connected to a first terminal of a first transformer coil of the dual active bridge 309, and the second ancillary terminal X2 102 is connected to a second terminal of the first transformer coil of the dual active bridge 309. Between a first output 301 of the dual active bridge 309 and a second output 302 of the dual active bridge 309, an ancillary supply voltage 303 of, for example, 12 V, is formed. The equivalent circuit diagram 320 shows the input side of the dual active bridge 309 in greater detail. The semiconductor switches of the half bridges 321 connected in parallel at the first ancillary terminal X1 101 and the half bridges 322 connected in parallel at the second ancillary terminal X2 102 are actuated in resonance to the dual active bridge 309, wherein an input voltage to the dual active bridge 309 is formed by the parallel circuit 234 of the energy accumulators in the respective first module of the strands.

Figure 4:
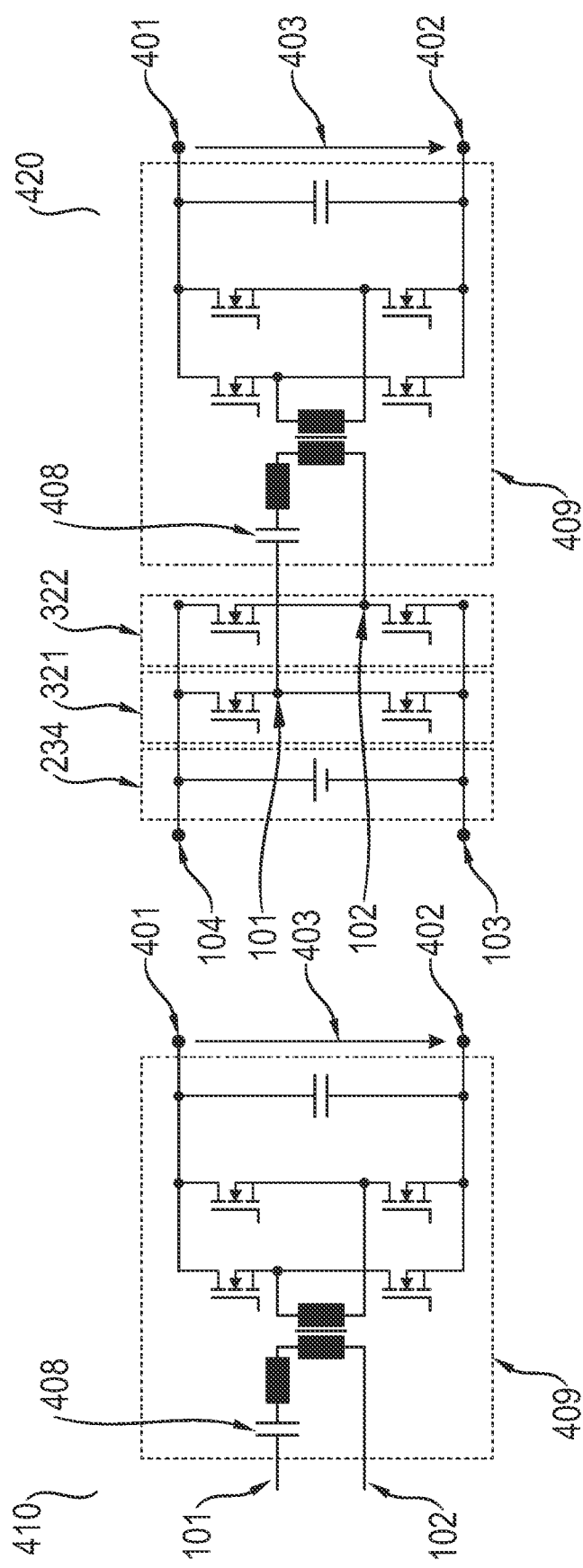
FIG. 4 schematically shows a configuration of a circuit according to an embodiment of the invention with an LLC converter as the first ancillary supply.

In FIG. 4, yet another configuration 410, 420 of the circuit according to an embodiment of the invention is shown schematically, with an LLC converter 409 as the first ancillary supply. In the circuit terminal 310, the first ancillary terminal X1 101 is connected to the resonance capacitance C 408 of the LLC converter 409 and the second ancillary terminal X2 102 is connected to the second terminal of the first transformer coil of the LLC converter 309. Between a first output 301 of the LLC converter 309 and a second output 302 of the LLC converter 309, an ancillary supply voltage 303 of, for example, 12 V is formed. In the equivalent circuit diagram 320, the input side of the LLC converter 309 is shown in greater detail. The semiconductor switches of the half bridges 321 connected in parallel at the first ancillary terminal X1 101 and the half bridges 322 connected in parallel at the second ancillary terminal X2 102 are actuated in resonance to the LLC converter 309, wherein an input voltage to the LLC converter is formed by the parallel circuit 234 of the energy accumulators in the respective first module of the strands.

Figure 5:
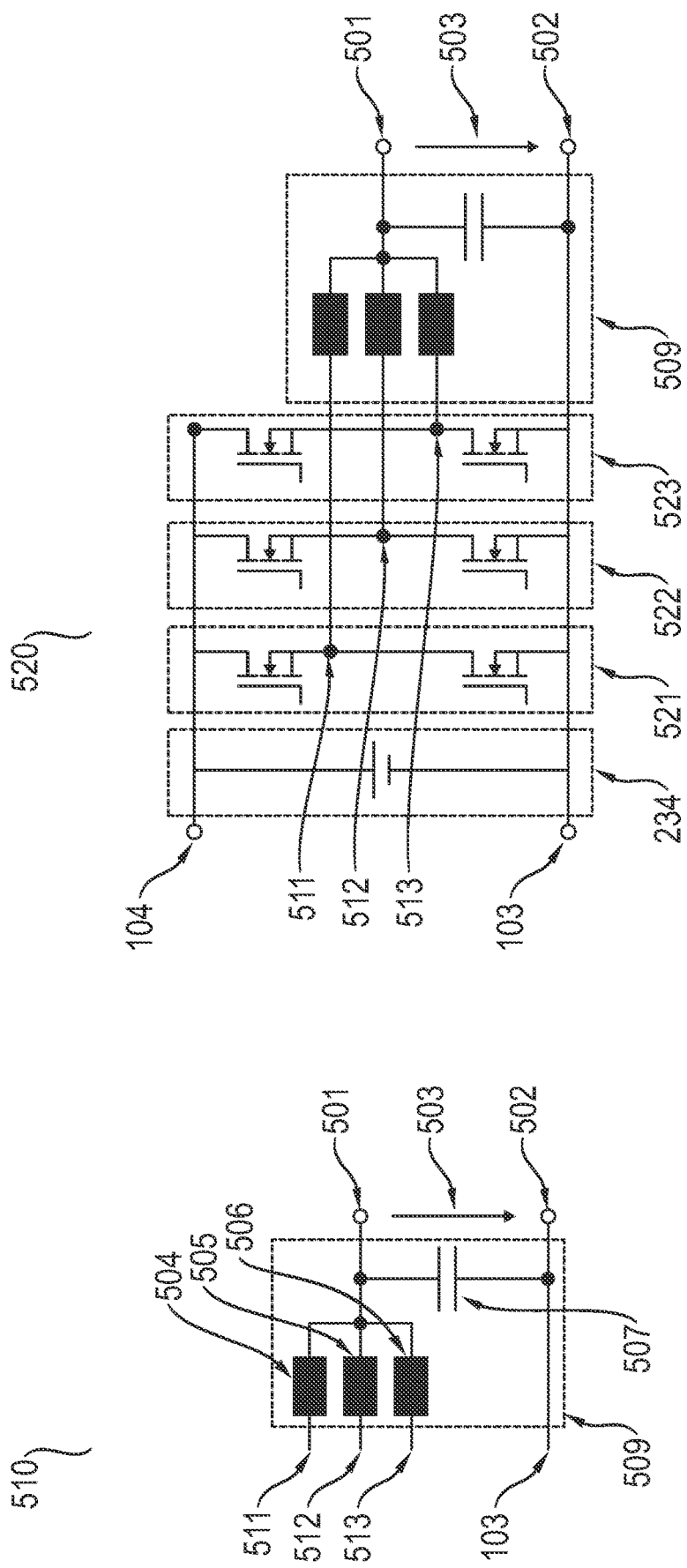
FIG. 5 schematically shows a configuration of a circuit according to an embodiment of the invention with a three-phase synchronous converter as the first ancillary supply.

In FIG. 5, a further configuration of the circuit according to an embodiment of the invention is shown schematically, with a three-phase synchronous converter 509 as the first ancillary supply. In the circuit terminal 510, respective input terminals 511, 512, 513 of the respective first module in the strand of the respective phase are connected to a respective inductance 504, 505, 506, such that the inductance 504 is connected to all of the input terminals 511 of the first module in the U-phase strand, the inductance 505 is connected to all of the input terminals 512 of the first module in the V-phase strand, and the inductance 506 is connected to all of the input terminals 513 of the first module in the W phase strand (plurality of input terminals corresponding to a number of half bridges on one side of the single module 190 from FIG. 1). The common negative potential terminal M 103 is connected to a capacitance 507. The inductances 504, 505, 506 and the capacitance 507 form the three-phase synchronous converter 509. Between a first output 501 of the three-phase synchronous converter 509 and a second output 502 of the three-phase synchronous converter 509, an ancillary supply voltage 503 of, for example, 12 V is formed. In the equivalent circuit diagram 520, the input side of the three-phase synchronous converter 509 is shown in greater detail, with a parallel circuit 521 of the input-side half bridges in the first module in the U-phase strand shown as an equivalent circuit diagram, a parallel circuit 522 of the input-side half bridges in the first module in the V-phase strand shown as an equivalent circuit diagram, and a parallel circuit 523 of the input-side half bridges in the first module in the W-phase strand shown as an equivalent circuit diagram.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100 Schematic circuit with ancillary terminals
101 Ancillary terminal X1
102 Ancillary terminal X2
103 Negative potential terminal M
104 Positive potential terminal P
109 Neutral point
110 Strand phase U 111 First module in strand for U-phase
112 Second module
113 Third module
114 Fourth module
115 Fifth module
116 Last module
119 Tapping of phase voltage $V_U$
120 Strand phase V
121 First module in strand for V-phase
122 Second module
123 Third module
124 Fourth module
125 Fifth module
126 Last module
129 Tapping of phase voltage $V_V$
130 Strand phase W
131 First module in strand for W phase
132 Second module
133 Third module
134 Fourth module
135 Fifth module
136 Last module
139 Tapping of phase voltage $V_W$
190 Single module
191 First input terminal
192 Second input terminal
193 First output terminal
194 Second output terminal
195 Energy accumulator
198 Single module symbol
199 Module circuit
201 First output of synchronous converter
202 Second output of synchronous converter
203 Ancillary supply voltage synchronous converter
204 Inductance
207 Capacitance
209 Synchronous converter
210 Circuit terminal synchronous converter
212 Parallel circuit of the half bridges
220 Equivalent circuit of synchronous converter
234 Parallel circuit of energy accumulator
301 First output of dual active bridge
302 Second output of dual active bridge
303 Output voltage of dual active bridge
309 Dual active bridge
310 Circuit terminal of dual active bridge
320 Equivalent circuit of dual active bridge
321 Parallel circuit of the half bridges with the first ancillary terminal X1
322 Parallel circuit of the half bridges with second ancillary terminal X2
401 First output of LLC converter
402 Second output of LLC converter
403 Output voltage of LLC converter
408 Capacitor
409 LLC converter
410 Circuit terminal of LLC converter
420 Equivalent circuit of LLC converter
501 First output of three-phase synchronous converter
502 Second output of three-phase synchronous converter
503 Output voltage of three-phase synchronous converter
504 Inductance $L_U$
505 Inductance $L_V$
506 Inductance $L_W$
507 Capacitance
509 Three-phase synchronous converter
510 Circuit terminal of three-phase synchronous converter
520 Equivalent circuit of three-phase synchronous converter
521 Half bridge first module in U-phase strand
522 Half bridge first module in V-phase strand
523 Half bridge first module in W-phase strand

The invention claimed is:

1. A method for ancillary supply in a modular multi-level converter, wherein the modular multi-level converter comprises a plurality of modules arranged in strands, wherein a respective module comprises at least two half bridges with semiconductor switches and at least one energy accumulator, which are interconnected in parallel, the method comprising:
    forming, in the respective module, an at least single-core input terminal through respective center tapping in at least one half bridge on an input side, and forming an at least single-core output terminal through respective center tapping in at least one half bridge on an output side;
    interconnecting the strands into at least one star point on the at least single-core input terminal of a first module in the respective strand;
    forming, on the at least single-core output terminal of a last module in the respective strand, a respective phase of a supply voltage in a high-voltage system;
    forming a respective ancillary terminal on a respective star point, wherein a common positive potential terminal having a respective positive potential of the first module is connected in the respective strand and a common negative potential terminal having a respective negative potential of the first module is connected in the respective strand; and
    providing a first ancillary supply in the respective strand by connecting a selected converter to an associated selection from among the respective ancillary terminal, the common positive potential terminal, and the common negative potential terminal, and by associated control of the semiconductor switches of the at least one input-side half bridge of the first module.

2. The method according to claim 1, comprising:
    selecting a synchronous converter as the converter; and
    connecting the respective ancillary terminal on the input side to an inductance L and connecting the common negative potential terminal to a capacitance C, whereby a synchronous converter is formed on the output side as the first ancillary supply.

3. The method according to claim 1, wherein the respective modules comprise four half bridges with dual-core input and output terminals, the method further comprising:
    forming two star points;
    connecting a first ancillary terminal to the first star point and a second ancillary terminal to the second star point;
    selecting a dual active bridge as the converter; and
    connecting, on the input side, the first ancillary terminal to a first terminal of a first transformer coil of the dual active bridge and connecting the second ancillary terminal to the second terminal of the first transformer coil of the dual active bridge.

4. The method according to claim 3, comprising:
    selecting an LLC converter as the converter;
    arranging a resonance capacitor for this purpose opposite the dual active bridge between the first ancillary terminal and the first terminal to the first transformer coil; and actuating the semiconductor switches of the parallel-connected half bridges are to a resonant operation of the LLC converter.

5. The method according to claim 1, comprising:
selecting a multi-phase synchronous converter as the converter arranging a respective inductance between the respective at least single-core input terminal of the first module in the respective strand and the at least one star point;
connecting the common negative potential terminal to a capacitance; and
forming a multi-phase synchronous converter by the respective inductances and the capacitance.

6. The method according to claim 1, comprising providing, by the common positive potential terminal and the common negative potential terminal, a second ancillary supply, which has a lower impedance compared to a direct tapping at the double star point.

7. The method according to claim 1, comprising forming the modular multi-level converter with three strands and providing a three-phase supply voltage for a three-phase motor of a vehicle is.

8. A circuit of an ancillary supply in a modular multi-level converter, comprising:
the modular multi-level converter;
a controller; and
a plurality of modules arranged in strands,
wherein a respective module comprises at least two half bridges with semiconductor switches and at least one energy accumulator, which are interconnected in parallel,
wherein, in the respective module, an at least single-core input terminal is formed through respective center tapping in at least one half bridge on an input side, and an at least single-core output terminal is formed through respective center tapping in at least one half bridge on an output side,
wherein the strands are interconnected into at least one star point on the at least single-core input terminal of a first module in a respective strand,
wherein, on the at least single-core output terminal of a last module in the respective strand, a respective phase of a supply voltage is formed in a high-voltage system,
wherein a respective ancillary terminal is formed on a respective star point,
wherein a common positive potential terminal having a respective positive potential of the first module is connected in the respective strand and a common negative potential terminal having a respective negative potential of the first module is connected in the respective strand, and
wherein, a first ancillary supply is provided in the respective strand by connecting a selected converter to an associated selection from among the respective ancillary terminal, the common positive potential terminal, and the common negative potential terminal, and by associated control of the semiconductor switches of the at least one input-side half bridge of the first module.

9. The circuit according to claim 8, wherein the converter is a synchronous converter,
wherein the respective ancillary terminal on the input side is connected to an inductance L and the common negative potential terminal is connected to a capacitance C, whereby a synchronous converter is formed on the output side as the first ancillary supply.

10. The circuit according to claim 8, wherein the respective modules comprise four half bridges with dual-core input and output terminals, and two star points are formed,
wherein a first ancillary terminal is connected to the first star point and a second ancillary terminal is connected to the second star point,
wherein a dual active bridge is selected as the converter, wherein, on the input side, the first ancillary terminal is connected to a first terminal of a first transformer coil of the dual active bridge and the second ancillary terminal is connected to a second terminal of the first transformer coil of the dual active bridge.

11. The circuit according to claim 10, wherein the converter is an LLC converter,
wherein a resonance capacitor is arranged for this purpose opposite the dual active bridge between the first ancillary terminal and the first terminal to the first transformer coil, and
wherein the controller is configured so as to switch the semiconductor switches of the parallel-connected half bridges according to a resonant operation of the LLC converter.

12. The circuit according to claim 8, wherein the converter is a multi-phase synchronous converter,
wherein a respective inductance is arranged between the respective at least single-core input terminal of the first module in the respective strand and the at least one star point,
wherein the common negative potential terminal is connected to a capacitance, and
wherein a multi-phase synchronous converter is formed by the respective inductances and the capacitance.

13. The circuit according to claim 8, wherein, by the common positive potential terminal and the common negative potential terminal, a second ancillary supply is provided, which has a lower impedance compared to a direct tapping at the double star point.

14. The circuit according to claim 6, wherein the modular multi-level converter is formed with three strands and a three-phase supply voltage for a three-phase motor is provided.

15. A modular multi-level converter having at least one ancillary supply comprising the circuit according to claim 8.

* * * * *